United States Patent [19]

Tacey

[11] 4,058,912
[45] Nov. 22, 1977

[54] DIDACTIC APPARATUS

[75] Inventor: Charles Arthur Tacey, Andover, England

[73] Assignee: Philograph Publications Limited, England

[21] Appl. No.: 658,966

[22] Filed: Feb. 18, 1976

[30] Foreign Application Priority Data

Feb. 19, 1975 United Kingdom ............... 7028/75

[51] Int. Cl.² .......................................... G09B 23/04
[52] U.S. Cl. ...................................................... 35/34
[58] Field of Search ............ 35/30, 31 R, 31 D, 31 F, 35/31 G, 34, 72, 73; 46/31

[56] References Cited

U.S. PATENT DOCUMENTS

| 1,880,130 | 9/1932 | Goldbach | 35/34 X |
| 2,472,439 | 6/1949 | Rogers | 35/31 F |
| 2,977,688 | 4/1961 | Redey | 35/34 X |

FOREIGN PATENT DOCUMENTS 538,284  1/1956  Italy ......................................... 35/34

OTHER PUBLICATIONS

Welch Scientific Co. Catalog, p. 39, Models 7589, 0129, 0133, © 1965, received in PTO Oct. 1965.

Primary Examiner—William H. Grieb
Attorney, Agent, or Firm—William Anthony Drucker

[57] ABSTRACT

The invention provides didactic apparatus for use by young children in ascertaining the volume of solid structures built from unit cubes or blocks, and broadly comprises a square base plate and two rectangular walls connected at right angles and mounted on said base plate so as to be in planes parallel with but spaced from two adjacent sides of said base plate. Said base plate and walls are each marked with grid lines each square of which is of unit dimensions and the grid lines of the base plate externally of said walls are consecutively numbered from the juncture of the walls. The walls, at least, are transparent and horizontal grid lines thereon are numbered consecutively from the bottom.

1 Claim, 7 Drawing Figures

DIDACTIC APPARATUS

This invention relates to didactic apparatus for use primarily in encouraging young children to establish and demonstrate how to ascertain the volume and areas of solid structures, and has for its object to provide simple but effective means whereby pupils will be able to readily calculate the area occupied by, or the three dimensional volume of, structures composed of unit cubes by reference to the scales of apparatus graduated in three planes, thus obviating the necessity for counting the individual cubes constituting said structures.

Broadly, apparatus according to the invention comprises a rectangular base plate, two rectangular walls connected at right angles and mounted on said base plate so as to be in planes parallel with but spaced from two adjacent sides of said base plate, said base plate and walls each being marked with grid lines each square of which is of unit dimensions and the grid lines of the base plate externally of said walls being consecutively numbered from the juncture of said walls.

Said walls at least will be of a transparent nature, and the apparatus may be constructed from a suitable synthetic resin, e.g. a methyl methacrylate polymer.

Said base plate and side walls may be separately constructed in order to enable an economy in storage and transport space, and be arranged for press fitting one to the other by means of co-operating interfitting parts. Alternatively the complete apparatus may be designed for unitary construction by a moulding or casting operation.

The invention is further described with the aid of the accompanying drawings which illustrate by way of examples only two embodiments.

Figure 1:
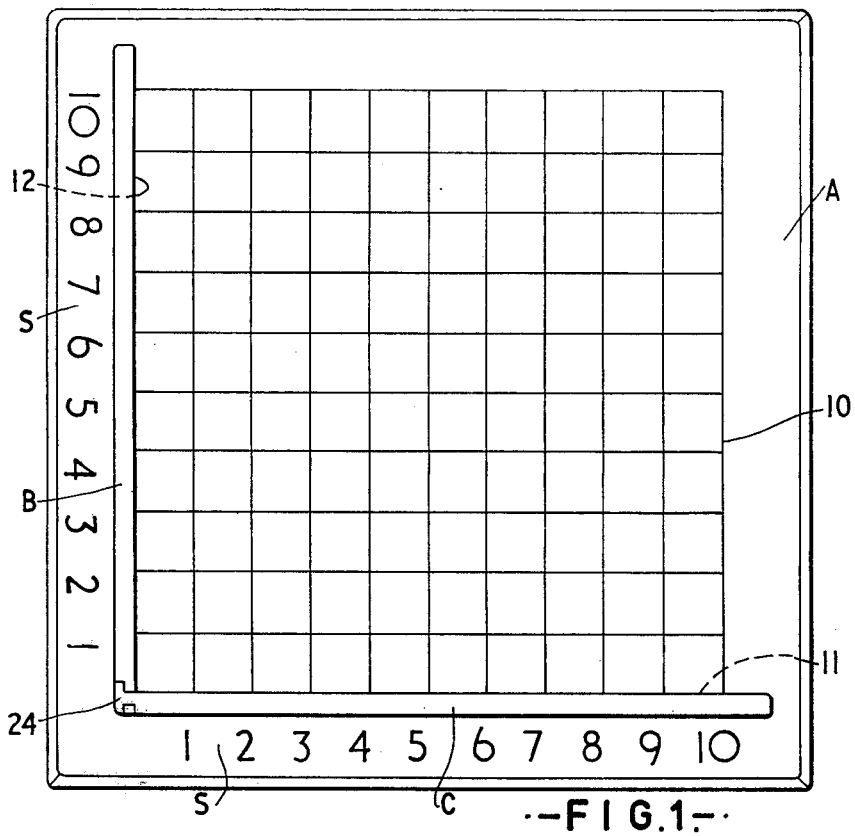
FIG. 1 is a plan view of didactic apparatus according to the invention more particularly intended for volumetric calculation.
Figure 2:
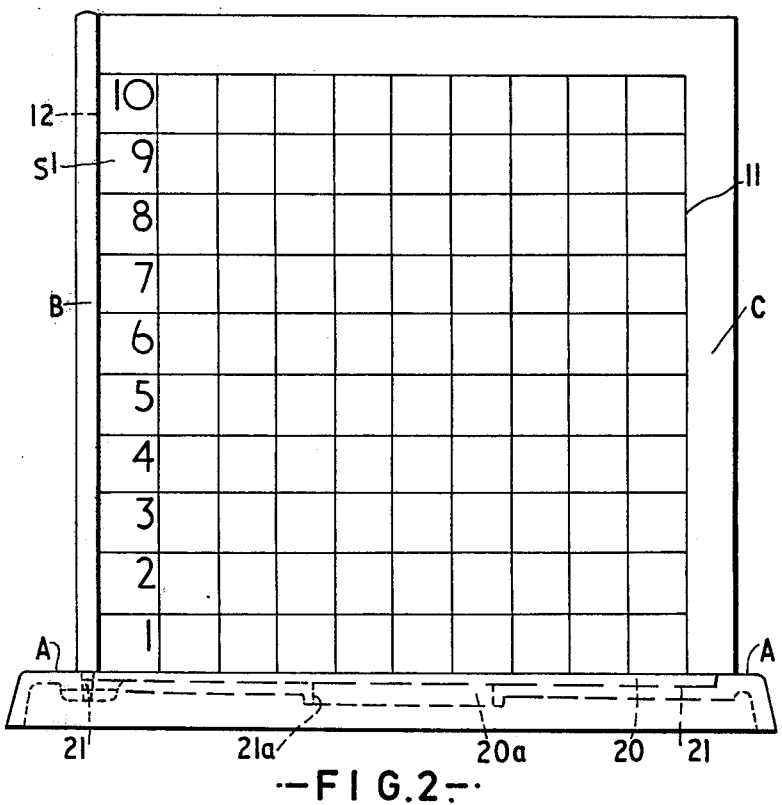
FIG. 2 is a front elevation thereof.

Referring to said drawings, and first to FIGS. 1 and 2, the apparatus is intended for use with provided unit cubes or blocks (e.g. 1 cm cubes), and comprises a square base plate A and vertical side walls B, C. As shown, the side walls B and C are normal to the base plate A and are connected at right-angles one to the other and mounted on said base plate so as to be parallel with but spaced from two adjoining side edges thereof. The base plate is marked as by scoring or engraving with a grid 10, the walls B and C defining the outer limits of two sides of said grid. The squares of the grid are of unit measurement.

In a similar manner the walls B and C are marked with vertical grids respectively designated 11 and 12, said grids corresponding with the grid 10 of the base plate and having the lines thereon in register with the lines of the grid 10 and with each other.

The margins of the base plate externally of said walls B and C are provided with scales S which consecutively number both the lines of the base plate grid 10 and the vertical lines of the wall grids 11 and 12. One wall C is marked as shown adjacent its juncture with the wall B with a scale S' in respect of the horizontal lines of each of the respective grids 11 and 12.

In use, unit cubes provided for the purpose may be used to construct three dimensional structures on the base plate A against the two walls B and C, said structures being of any size within the limits of the apparatus. The volume of said structures can readily be calculated by reference only to the scales marked on the base plate and the walls and without the necessity for counting the individual cubes of said structure.

Figure 6:
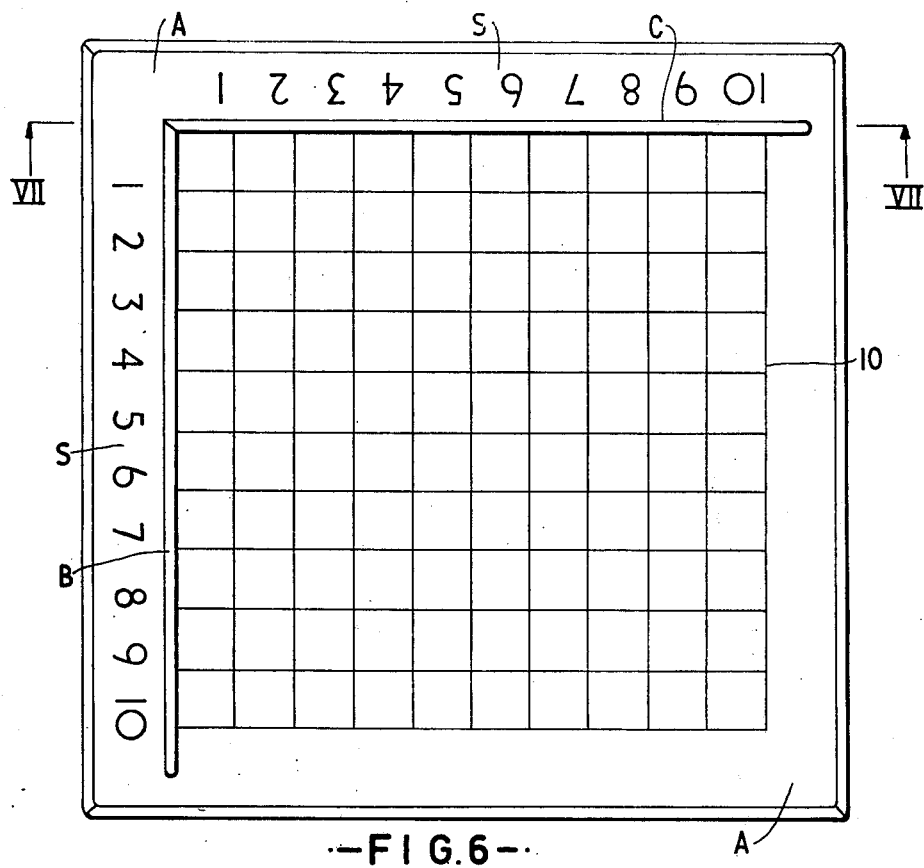
FIG. 6 is a plan view of modified apparatus having side walls which are only one unit in height.
Figure 7:
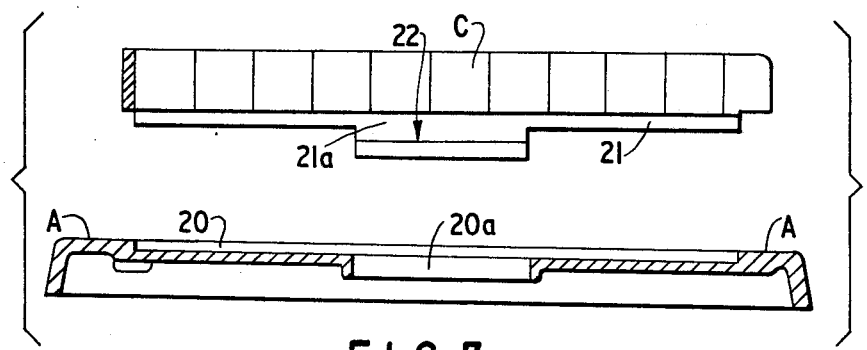
FIG. 7 is an exploded sectional elevation on line VII—VII of FIG. 6.

In FIGS. 6 and 7, wherein like characters of reference have been used to denote like or equivalent parts, the walls B and C are only of unit depth. In this instance the apparatus is usable only for calculating areas and only the base plate A need be provided with a grid 10 and numbered scales S.

As will be clear, the walls B and C of the apparatus of FIGS. 1 and 2 need to be transparent in order to enable a visual inspection of structures built on the base plate against the provided scales.

Figure 3:
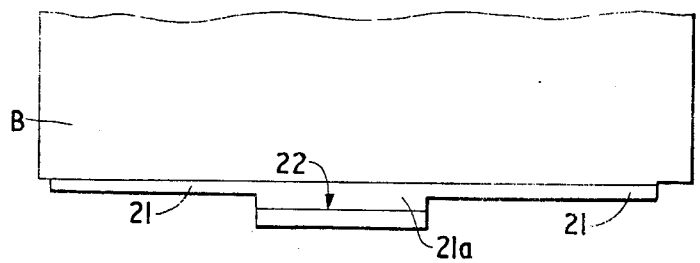
FIG. 3 is a fragmentary elevation depicting the bottom of one of the walls of the apparatus illustrating an assembly tongue thereof.
Figure 4:
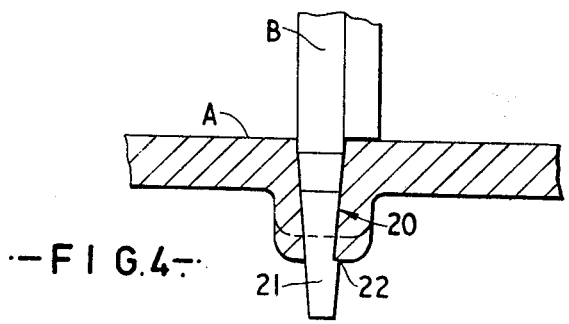
FIG. 4 is a fragmentary sectional view showing said tongue fixedly engaged with an aperture of a base plate.

In one form of construction which is applicable to both described forms of apparatus, the base plate A is an inverted tray-like component and is formed with appropriately situated recesses 20 with medial slots 20a adapted to receive correspondingly shaped tongue parts 21, 21a projecting from the lower edges of the walls B and C, all as shown most clearly in FIGS. 3 and 4. Each slot 20a is formed so as to be of a downwardly tapering nature and the Co-operating tongue part 21a is correspondingly shaped and has a depth greater than the depth of said slot. Said tongue part 21a is also formed with a rearwardly facing shoulder 22 as shown most clearly in FIG. 3.

The tongues 21a are arranged so as to be a force fit within the slots 20a whereby the shoulders 22 become fixedly engaged below the margins of the slots to lock the walls in position.

Figure 5:
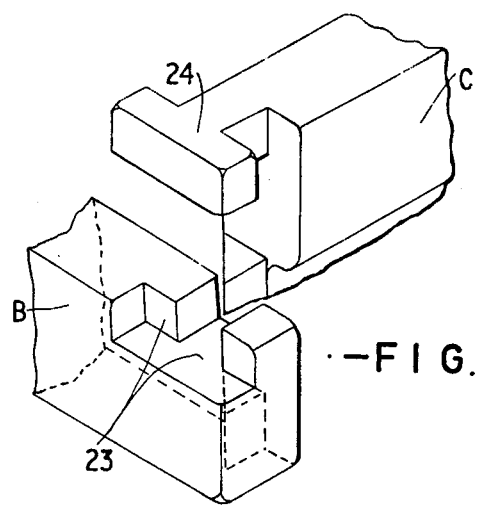
FIG. 5 is an exploded perspective view illustrating in more detail the method of connecting the upper parts of the walls of the apparatus.

The upper edge of the wall B adjacent its intended juncture with the wall C is formed with a T-shaped recess 23 (FIG. 5) and the wall C is formed with a laterally extending T-piece 24 for engaging in said recess 23.

In assembling the apparatus, the wall B is first locked to the base plate A by means of the co-operating parts 20/21 and 20a/21a and then the wall C is locked in position on the base plate with its T-piece 24 engaged with the recess 23. The three components of the structure thus become fixedly connected one to the other.

Apparatus as described is suitable for use by individual children or small groups of children working together.

I claim:

1. Didactic apparatus for the purpose specified, and for use with 1cm. unit cubes, comprising:
   i. a rectangular base plate having an upper face marked with a grid defining 1cm. squares, said grid having its boundaries spaced by a first edge portion from a first edge of the base plate, and by a second edge portion from a second adjoining edge of the base plate, said base including slots,
   ii. a first transparent rectangular wall mounted on said base normal to the plane of said upper face and positioned along the boundary of the grid spaced from the first edge of the base plate, said first wall including a tongue for engagement in a respective slot of the base to locate and connect the wall to the base, said tongue including a shoulder for abutment against the base to retain the tongue in engagement in said slot, iii. a second transparent rectangular wall mounted on said base plate normal to the plane of said upper face and positioned along the boundary of the grid spaced from the second edge of the base plate, said second wall being joined at a right angle to said first wall, said second wall including a tongue for engagement in a respective slot of the base to locate and connect said wall to the base, said tongue including a shoulder for abutment against the base to retain the tongue in engagement in said slot, one of said first and second walls includng a T-piece tenon formation remote from the base and the other of said first and second walls including a corresponding recess formation remote from the base for interengegement to connect said first and second walls together, said first and second walls being marked with grid lines defining 1cm. squares commencing from the line of juncture of the walls with the base plate, and the line of juncture of the walls with each other, the grid lines of the base plate being numbered consecutively on said edge portions starting from the juncture of said walls, and the horizontal grid lines marked on said walls being numbered consecutively starting from the juncture of each wall with the base.

* * * * *